(12) United States Patent
Ghazarian et al.

(10) Patent No.: US 8,843,068 B2
(45) Date of Patent: Sep. 23, 2014

(54) SUPERVISORY HEADSET MOBILE COMMUNICATION SYSTEM

(76) Inventors: Ohanes D. Ghazarian, Henderson, NV (US); John Patrick Ghazarian, Carpinteria, CA (US)

( * ) Notice: Subject to any disclaimer, the term of this patent is extended or adjusted under 35 U.S.C. 154(b) by 121 days.

(21) Appl. No.: 13/385,848

(22) Filed: Mar. 8, 2012

(65) Prior Publication Data

US 2013/0143500 A1 Jun. 6, 2013

Related U.S. Application Data

(60) Provisional application No. 61/630,191, filed on Dec. 5, 2011.

(51) Int. Cl.
*H04B 7/00* (2006.01)
(52) U.S. Cl.
USPC ........................ 455/41.3; 455/41.2; 455/575.2
(58) Field of Classification Search
USPC ........................................................ 455/41.3
See application file for complete search history.

(56) References Cited

U.S. PATENT DOCUMENTS

| | | | | |
|---|---|---|---|---|
| 5,298,884 | A | * | 3/1994 | Gilmore et al. ............ 340/573.4 |
| 2008/0146290 | A1 | * | 6/2008 | Sreeram et al. ............ 455/569.1 |
| 2012/0101396 | A1 | * | 4/2012 | Solosko et al. .............. 600/509 |

* cited by examiner

*Primary Examiner* — Ajibola Akinyemi

(57) ABSTRACT

A supervisory mobile communication headset system comprises of a first mobile communication device and a mobile headset, each having an RF transceiver used to establish RF audio and RF supervisory communication between the first mobile communication device and the mobile headset, wherein when both devises carried by the user are within near communication proximity of the other. When the first mobile communication device moves away from communication proximity of the headset, the first mobile communication device in response to RF communication signal lose, it generates warning alarm signal(s) to remind the user to carry the mobile headset.
The mobile communication device may securely be attached to the user limp with removal tamper detection circuitry. Further the mobile communication device may contain a GPS receiver used for a monitoring station to track the location of the mobile communication device, and establish communication with the headset user.

8 Claims, 2 Drawing Sheets

Block Diagram

SUPERVISORY HEADSET MOBILE COMMUNICATION SYSTEM

This application is related to U.S. provisional application 61/630,191 filed on Dec. 5, 2011 Supervisory Headset Mobile Communication system

BACKGROUND OF THE INVENTION

In the pass headset or ear sets were designed to use with mobile communication devices, but in many instances individuals forget to carry the headset with them which then caused a little inconvenience. But recently with new governing laws which forbids individuals using mobile communication devices without the use of a hands free headset to allow the driver to have two hands on the vehicle steering wheel while using a mobile communication devices.

Also GPS based offender tracking system it's been in use wherein the tracking device contained a cellular or satellite module, a speaker and a microphone, used for a monitoring station operator to call in to establish conversation with an offender. Unfortunately the monitoring station conversation was broadcasted over the tracking device speaker thus every one located near by the offender could hear the conversation, as such systems violates the offender's privacy.

It is accordingly primary objective of the present invention to provide a wireless headset used with a supervisory mobile communication system which is designed to remind the user to carry on the wireless headset with the mobile communication device to ascertain the user safely use the mobile communication device hands free wile driving a vehicle, or when the user desires to have a hands free private communication with other communication device user(s).

It is accordingly another objective of the present invention to provide a wireless headset used with a supervisory mobile communication system which is designed to remind the user to carry on both the wireless headset and the mobile communication device to ascertain the user while driving a vehicle can safely use their mobile communication device hands free, or when the user desires to have a hands free private communication with other communication device user(s).

It is further objective of the present invention utilizes a wireless headset which may be use with a supervised GPS mobile communication device, wherein the GPS mobile communication device contains a cellular or satellite communication module to establish communication with a monitoring station. The GPS mobile communication device is securely attached to the person's (Offender) limp containing a short range RF transceiver used to establish RF audio communication and RF supervisory communication with the person wireless headset, Wherein when the person to be monitored moves a preset distance away from the proximity of the wireless headset, the GPS mobile communication device in response to RF communication signal lose with the wireless headset, generates warning alarm signal(s) to remind the person to be monitored to carry on the wireless headset, to ascertain the person to be monitored carry the wireless headset all the time and not walk away without the headset device.

It is further objective of the present invention that provides a wireless headset which may be used to establish a private conversation between a monitoring station operator and a person to be monitored. Herein describe as;

SUMMARY OF THE INVENTION

A supervisory mobile communication headset system comprises of a first mobile communication device and a wireless headset, each having an RF transceiver configured to establish RF audio and RF supervisory communication between the first mobile communication device and the wireless headset, wherein when both devices carried on by the user are within near proximity of the other. Whereas the first mobile communication device is configured to establish RF audio communication in between the headset and at least one or more plurality of secondary communication devices, the system comprises;

- a wireless headset or a ear set housing containing a battery as power supply;
- a processor,
- a speaker and a microphone;
- an RF transceiver used for establishing short range RF audio and RF supervisory communication with a first mobile communication device; and
- a first mobile communication device having a battery as power supply
- a processor coupled to an alerting device circuitry;
- a RF transceiver(s) used to establish short range RF audio and RF supervisory communication with the wireless headset;
- a second RF transceiver used for establishing RF audio communication with at least one or more secondary communication device(s);

The first mobile communication device processor configured to activate the first mobile communication device alerting circuitry to indicate to the user the wireless headset device is beyond audio communication range of the first mobile communication device wherein when the supervisory communication confirmation signal(s) are lost in between the wireless headset and the first mobile communication device.

The supervisory mobile communication headset system of the present invention first mobile communication processor further is configured to activate the alerting device circuitry to warn the user the wireless headset power may be off, wherein when the supervisory communication confirmation signal(s) become lost in between the wireless headset and the first mobile communication device.

The supervisory mobile communication headset of the present invention processor is connected to a alerting device circuitry, the wireless headset processor configured to activate the headset alerting device circuitry to indicate to the user the wireless headset is beyond communication range of the first mobile communication device or the first mobile communication device power may be off wherein when the supervisory communication confirmation signal(s) are lost in between the wireless headset and the first mobile communication device.

The supervisory mobile communication wireless headset configured to communicate with RF audio signals and communicate with RF supervisory signals with a first mobile communication device, which is securely attached to a person limp using a tamper detection circuitry to ascertain the user carry on the first mobile communication device. The first mobile communication device is configured to establish RF audio communication between the headset device and at least one or more plurality of other secondary communication devices, the system comprises;

- a wireless headset housing containing a battery used as power supply;
- a processor;
- a speaker and a microphone;
- an RF transceiver(s) used for establishing short range RF audio and RF supervisory communication with the first mobile communication device; and a first mobile communication device having a battery as power supply a processor coupled to an alerting device circuitry;

a RF transceiver(s) used to establish short range RF audio and RF supervisory communication with the wireless headset;

a second RF transceiver used for establishing RF audio and data communication with plurality of other secondary communication device(s)

The first mobile communication device processor configured to activate the alerting device circuitry to indicate to the user the wireless headset unit is beyond communication range of the first mobile communication device or the headset power may be off, when the supervisory communication confirmation signal(s) become lost in between the wireless headset and the first mobile communication device.

The supervisory mobile communication headset system of the present invention first mobile communication device processor activates the first mobile communication device alerting circuitry to indicate the supervisory communication signal loss between the wireless headset and the first mobile communication device, and the first mobile communication device processor activates the first mobile communication device alerting circuitry for a second time when the supervisory communication signal(s) becomes connected between the wireless headset and the first mobile communication device, the second alert being distinct from the first alert.

The supervisory mobile communication headset system of the present invention wireless headset processor activates the headset alerting device to indicate the supervisory communication signal loss between the headset and the first mobile communication device, and the wireless headset processor activates the headset alerting device circuitry for second time when the supervisory communication signal(s) becomes connected between the wireless headset and the first mobile communication device, the second alert being distinct from the first alert.

The supervisory mobile communication headset system of the present invention first mobile communication device may have a GPS receiver to send the first mobile communication device location information by wirelessly means to a monitoring station, and the GPS mobile communication device is attached to a person limp with a tamper detection circuitry to ascertain the person to be monitored is carrying the GPS mobile communication device all the time. The GPS mobile communication device processor configured to activate the GPS mobile communication device alerting circuitry indicative of the wireless headset device is beyond communication range of the GPS mobile communication device wherein when the supervisory communication confirmation signal(s) are lost in between the wireless headset and said GPS mobile communication device, and the GPS mobile communication device processor in response to detecting first GPS mobile communication device tamper or removal from the person limp, the GPS mobile communication device RF transceiver wirelessly transmits at least one signal to a monitoring station communication device(s) containing information to the GPS mobile communication device tamper detection along with the GPS mobile communication device ID information, and GPS mobile communication device location information.

The supervisory mobile communication headset system of the present invention supervisory RF communication signal(s) may contain low battery detection signal(s), the first mobile communication device processor in response to received low battery detection signal from the wireless headset device, the first mobile communication device activates the alerting device circuitry to warn the user the headset battery condition is low;

The supervisory RF communication signal(s) may contain low battery detection signal(s), in which the wireless headset in response to received low battery detection signal from the first mobile communication device activates the headset alerting device circuitry to warn the user the first mobile communication device battery condition is low.

The supervisory mobile communication wireless headset and first mobile communication device generated signals are audio, verbal, visual, alphanumeric, symbol(s) or icon(s) and my be of vibrating signals used to alert the user to carry both the headset and the mobile communication device to ascertain the user have the access to the use of the wireless headset with the first mobile communication device or GPS mobile communication device at all time, and the alerting device circuitry generated signals may be used to indicate low battery condition of the wireless headset or to the first mobile communication device.

DETAILED DESCRIPTION OF THE INVENTION

Figure 1:
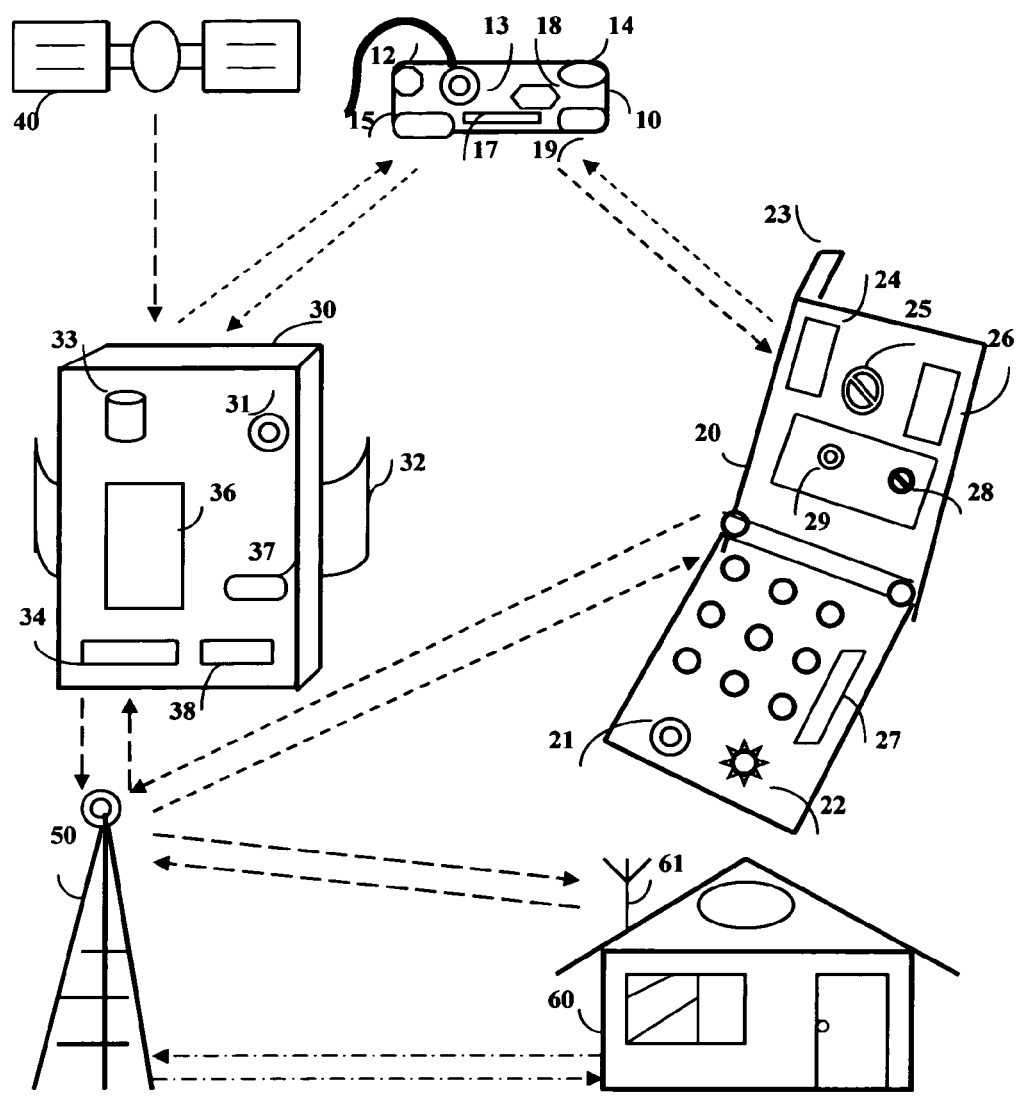
FIG. 1 Is a drawing of user supervisory headset, a mobile communication device, and a offender tracking device.
Figure 2:
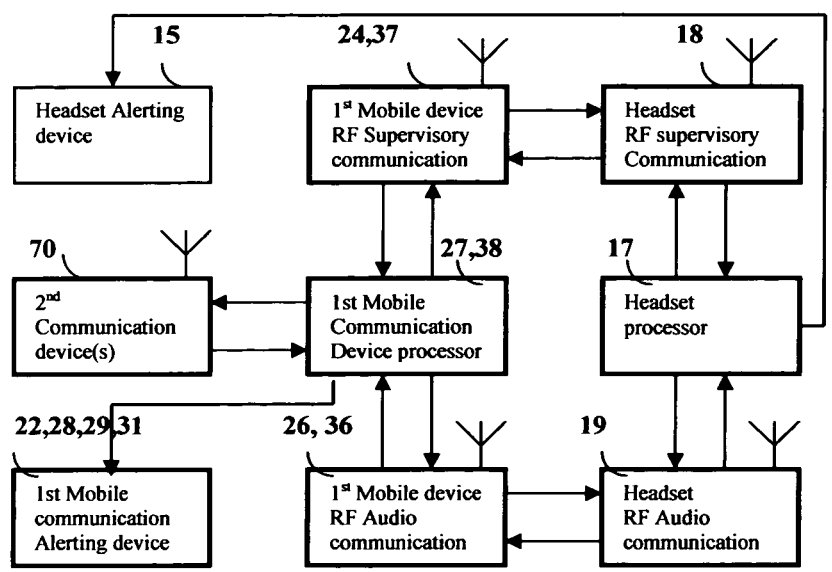
FIG. 2 Is the Block Diagram

A supervisory mobile communication headset system FIG. 1 utilizing a user carry on first mobile wireless communication device 20 and a mobile wireless headset device 10, each one of the devices 10, 20 having an RF transceiver configured to establish RF audio 19, 26 and RF supervisory 18, 24 communication between the first mobile communication device 20 and the mobile wireless headset device 10, wherein when both devices 10, 20 are within near proximity of the other, the system comprises;

a wireless headset 10 or a ear set 10 housing containing a battery 14 as power supply, a processor 17, a speaker 13 and a microphone 12, an RF transceiver 18, 19 used for establishing short range RF audio and RF supervisory communication with the first mobile communication device 20.

And a first mobile communication device 20 having a battery as power supply, a processor 27 coupled to an alerting device(s) 22, 28, 29 circuitry;

an RF transceiver(s) 24, 26 used to establish short range RF audio and RF supervisory communication with said wireless headset 10;

a second RF transceiver 23 used for establishing RF audio or data communication with at least one or more plurality of secondary communication device(s) 60, 61 which may use land line or other wireless communication devices;

The first mobile communication device 20 processor 27 is configured to activate the first mobile communication device 20 alerting circuitry 22, 28, 29 indicative of the wireless headset device 10 is beyond communication range of the first mobile communication device 20 wherein when the supervisory communication confirmation signal(s) 18, 24 are lost in between the wireless headset 10 and the first mobile communication device 20.

The supervisory mobile communication headset system of the present invention first mobile communication device 20 processor 27 further is configured to activate the mobile communication device 20 alerting circuitry 22, 28, 29 to warn the user the wireless headset 10 power may be off wherein, when the supervisory communication confirmation signal(s) 18, 24 become lost in between the wireless headset 10 and the first mobile communication device 20.

the supervisory mobile communication headset system first mobile communication device 20 processor 27 further is configured to activate the mobile communication device 20 alerting circuitry 22, 28, 29 in response to receiving low battery condition signal from the wireless headset device 10.

The supervisory mobile communication headset system first mobile communication device 30 is securely attached by a strap 32 to a person limp having a tamper detection circuitry to ascertain the user carry on the first mobile communication device 30, the first mobile communication device is configured to establish RF audio or data communication through an cell, satellite, LAN, WAN, Internet etc. 50 with at least one or more plurality of other secondary communication devices 60, 61.

The supervisory mobile communication headset system first mobile communication device 20 processor 27 activates the first mobile communication device 20 alerting circuitry 22, 28, 29 to indicate the supervisory communication signal loss between the wireless headset 10 and the first mobile communication device 20, and the first mobile communication device 20 processor 27 activates the alerting device circuitry 22, 28, 29 for a second time when the supervisory communication signals 18, 24 becomes connected between the wireless headset 10 and the first mobile communication device 20, the second alert being distinct from the first alert.

The supervisory mobile communication headset system first mobile communication device 20 generated signals are audio 25, verbal 25, visual 22, alphanumeric, symbol(s) 28, 29 or icon(s) 28, 29 and my be of vibrating signals used to alert the user to carry the wireless headset device 10 or both the wireless headset 10 and the first mobile communication device 20 to ascertain the user have the access to the use of the wireless headset 10 with the mobile communication device 20 at all time, and the alerting device circuitry generated signal(s) 22, 28, 29 may be used to indicate low battery condition of the wireless headset 10 device.

The supervisory mobile communication headset system of present invention utilizes a GPS based mobile communication device 30 which is securely attached by the use of a strap 32 to a person's limp with a tamper detection circuitry, to ascertain GPS mobile communication device 30 is attached to the person to be monitored and to be communicate with. And a wireless headset device 10 is provided to the person to be monitored, each one of the devices 10, 30 having an RF transceiver 18, 19, 36, 37 configured to establish RF audio and RF supervisory communication between the GPS mobile communication device 30 and the wireless headset device 10, wherein when both devices 10, 30 are within near proximity of the other, the system comprises;

a wireless headset 10 or a ear set 10 housing containing a battery 10 as power supply, a processor 17, a speaker 13 and a microphone 12. RF transceiver 18, 19 used for establishing short range RF audio and RF supervisory communication with the GPS mobile communication device 30;

And a GPS mobile communication device 30 having a battery as power supply, a processor coupled to an alerting device circuitry 31;

An RF transceiver(s) 36, 37 used to establish short range RF audio and RF supervisory communication with the wireless headset 10;

A second RF transceiver used for establishing RF audio or data communication with at least one or more plurality of secondary communication device(s) 60, 61;

a GPS receiver 33 used to receive global position signals from orbiting satellites 40, to coordinate the GPS mobile communication device 30 location. The GPS mobile communication device 30 processor 38 configured to activate the GPS mobile communication device 30 alerting circuitry 31 indicative of the wireless headset device 10 is beyond communication range of the GPS mobile communication device 30 wherein when the supervisory communication confirmation signal(s) 18, 37 are lost in between the wireless headset device 10 and the GPS mobile communication device 30.

And the GPS mobile communication device 30 processor 38 in response to detecting the GPS mobile communication device 30 tamper or removal from said person limp, the GPS mobile communication device secondary RF transceiver 34 wirelessly transmits a signal(s) to at least one or more plurality of secondary communication device(s) 60, 61 containing information to the GPS mobile communication device 30 tamper detection condition with the GPS mobile communication device 30 ID information along with the GPS mobile communication device 30 location information.

the supervisory mobile communication headset system supervisory RF communication signal(s) 18, 37 may contain the wireless headset 10 low battery detection signal(s), the GPS mobile communication device 30 processor 38 in response to received low battery detection signal from the wireless headset 10, the GPS mobile communication device 30 activates the GPS mobile communication device alerting circuitry 31 to warn the user that the wireless headset 10 battery condition is low, or the supervisory RF communication signal(s) may contain low battery detection signal(s) in which the wireless headset 10 in response to received low battery detection signal from the GPS mobile communication device 30 activates the wireless headset 10 alerting device circuitry 15 to warn the user the GPS mobile communication device 30 battery condition is low.

The supervisory mobile communication headset system GPS mobile communication device 30 processor 38 further is configured to activate the GPS mobile communication device 30 alerting circuitry 31 to warn the user the wireless headset 10 power may be off wherein when the supervisory communication confirmation signal(s) 18, 37 become lost in between the wireless headset 30 and the GPS mobile communication device 30.

The supervisory mobile communication headset system GPS mobile communication device 30 processor 38 activates the GPS mobile communication device 30 alerting circuitry 31 to indicate the supervisory communication signal(s) 18, 37 loss between said wireless headset 10 and said GPS mobile communication device, and the GPS mobile communication device processor 38 activates the alerting device 31 circuitry for a second time when the supervisory communication signal(s) 18, 37 becomes connected between the wireless headset 10 and the GPS mobile communication device 30, the second alert being distinct from the first alert.

The supervisory mobile communication headset system GPS mobile communication device 30 generated signals 31 are audio, verbal, visual, alphanumeric, symbol(s) or icon(s) and my be of vibrating signals used to alert the user to carry the wireless headset device 10 to ascertain the person to be monitored have access to the use of the wireless headset 10 with the GPS mobile communication device 30 at all time, and the alerting device circuitry generated signal(s) 31 may be used to indicate low battery condition of the wireless headset 10 or to the GPS mobile communication device 30.

The supervisory mobile communication headset system may be utilized with any electronic device without having a secondary RF transceivers to communicate with other secondary communication devices, whereas each one of the devices having an RF transceiver configured to establish RF audio and RF supervisory communication between the electronic device and the wireless headset device, wherein when both devices are within near proximity of the other, the system comprises;

The electronic device processor configured to activate the electronic device alerting circuitry, indicative of the wireless headset device is beyond communication range of the electronic device, wherein when the supervisory communication confirmation signal(s) are lost in between the wireless headset and the electronic device.

The invention claimed is:

1. A supervisory mobile communication headset system utilizing a user carry on first mobile communication device and a mobile wireless headset device, each one of said devices having an RF transceiver configured to establish RF audio, or RF audio and RF supervisory communication between said first mobile communication device and said mobile wireless headset device, wherein when both devices are located within near proximity of the other, said system comprises;
   a first mobile communication device having an housing containing battery or other power means used for power supply,
   a first RF transceiver, and
   a second RF transceiver,
   a processor coupled to an alerting circuitry, and
   a wireless headset or an ear-set housing containing battery or other power means used for power supply,
   a processor,
   a speaker and a microphone,
   an RF transceiver,
   said mobile communication device first RF transceiver is used for establishing RF audio or RF audio and RF supervisory communication between said wireless headset device and said mobile communication device, and
   said mobile communication device second RF transceiver is used to establish RF audio or RF audio and Data communication between said mobile communication device and at least one or more plurality of secondary communication device(s), which is used to establish a communication link between said mobile headset device and at least one or more plurality of secondary communication devices;
   wherein said first mobile communication device processor alerting circuitry is configured to indicate when said communication signal(s) is lost between said wireless headset and said first mobile communication device, and said first mobile communication device processor alerting circuitry indicates when said communication signals becomes connected between said wireless headset and said first mobile communication device, at least one of said indicative signal(s) is distinct from the other.

2. A supervisory mobile communication headset system as claimed in claim 1 wherein said first mobile communication device generated alerting signals are audible, verbal, visual, alphanumeric, symbol(s) or icon(s) and my be of vibrating signals, or generated by other alert signaling means, used to alert said user to carry said wireless headset device or both the wireless headset and said first mobile communication device to ascertain the user have the access to the use of said wireless headset with said mobile communication device.

3. A supervisory mobile communication headset system utilizing a GPS based mobile communication device securely attached to a person's limp with a tamper detection circuitry to ascertain GPS mobile communication device is attached to said person to be monitored, and a wireless headset device each one of said devices having an RF transceiver configured to establish RF audio or RF audio and RF supervisory communication between said GPS mobile communication device and said wireless headset device, wherein when both devices are within near proximity of the other, said system comprises;
   a wireless headset or an ear-set housing containing a battery as power supply,
   a processor, a speaker and a microphone,
   an RF transceiver used for establishing short range RF audio or RF audio and RF supervisory communication with said GPS mobile communication device; and
   a GPS mobile communication device having a battery as power supply,
   a processor coupled to an alerting device circuitry;
   a RF transceiver(s) used to establish short range RF audio or RF audio and RF supervisory communication with said wireless headset;
   a second RF transceiver used, for establishing RF audio and data communication between said GPS mobile communication device and at least one or more plurality of secondary communication device(s); which is used to establish a communication link between said mobile headset device and at least one or more plurality of secondary communication devices;
   a GPS receiver used to receive global position signals from orbiting satellites to coordinate said GPS mobile communication device location, said GPS mobile communication device processor configured to activate said GPS mobile communication device alerting circuitry indicative of said wireless headset device is beyond communication range of said GPS mobile communication device, or wherein when said communication signal(s) are lost in between said wireless headset and said GPS mobile communication device,
   and said GPS mobile communication device processor in response to detecting said GPS mobile communication device tamper or removal from said person limp, said GPS mobile communication device second RF transceiver wirelessly transmits a signal(s) to at least one or more plurality of secondary communication device(s) containing information to said GPS mobile communication device at least, ID information, tamper detection condition, GPS mobile communication device location information, or GPS communication device ID information and tamper condition, or GPS device ID information and the location information, or GPS device ID information and tamper condition along with GPS mobile communication device location information.

4. A supervisory mobile communication headset system as claimed in claim 3 wherein said RF communication signal(s) between said headset and first mobile communication device may contain low battery detection signal(s), said GPS mobile communication device processor in response to received low battery detection signal from said wireless headset, said GPS mobile communication device activates said GPS mobile communication device alerting circuitry to warn the user said wireless headset battery condition is low, or said RF communication signal(s) may contain low battery detection signal(s), in which said wireless headset in response to received low battery detection signal from said GPS mobile communication device activates said wireless headset alerting device circuitry to warn the user said GPS mobile communication device battery condition is low.

5. A supervisory mobile communication headset system as claimed in claim 3 wherein said GPS mobile communication processor further is configured to activate said GPS mobile communication device alerting circuitry to warn the user said wireless headset power may be off wherein when the communication signal(s) becomes lost in between said wireless headset and said GPS mobile communication device.

6. A supervisory mobile communication headset system as claimed in claim 3 wherein said GPS mobile communication device processor alerting circuitry is configured to indicate said communication signal(s) is lost between said wireless headset and said GPS mobile communication device, and said GPS mobile communication device processor
  alerting circuitry indicates when said communication signal(s) becomes connected between said wireless headset and said GPS mobile communication device, at least one of said indicative signal(s) is distinct from the other.

7. A supervisory mobile communication headset system as claimed in claim 3 wherein said GPS mobile communication device generated alerting signals are audible, verbal, visual, alphanumeric, symbol(s) or icon(s) and may be of vibrating signals, or generated by other alerting signal means, used to alert said user to carry said wireless headset device to ascertain said user have the access to the use of said headset with said GPS mobile communication device, and said alerting device circuitry generated signal(s) may be used to indicate low battery condition of said wireless headset or said GPS mobile communication device.

8. A supervisory mobile communication headset system as claimed in claim 3 wherein said GPS mobile communication device second RF transceiver is used for establishing data communication between said GPS mobile communication device and at least one or more plurality of secondary communication device(s).

* * * * *